US008303857B2

(12) United States Patent
Seeboth et al.

(10) Patent No.: US 8,303,857 B2
(45) Date of Patent: Nov. 6, 2012

(54) COMPOSITE WITH INVERSE THERMOCHROMIC PROPERTIES, COMPOSITE MATERIAL CONTAINING THIS AND ALSO USE THEREOF

(75) Inventors: Arno Seeboth, Berlin (DE); Olaf Mühling, Berlin (DE); Ralf Ruhmann, Berlin (DE); Renate Vetter, Berlin (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 67 days.

(21) Appl. No.: 12/596,072

(22) PCT Filed: Apr. 16, 2008

(86) PCT No.: PCT/EP2008/003044
§ 371 (c)(1),
(2), (4) Date: Mar. 25, 2010

(87) PCT Pub. No.: WO2008/125350
PCT Pub. Date: Oct. 23, 2008

(65) Prior Publication Data
US 2010/0181541 A1    Jul. 22, 2010

(30) Foreign Application Priority Data
Apr. 16, 2007    (DE) .................. 10 2007 017 791

(51) Int. Cl.
G02B 5/23    (2006.01)
B32B 9/04    (2006.01)

(52) U.S. Cl. .................. 252/586; 106/31.17; 106/31.19; 106/31.2; 106/311; 106/493; 106/498; 116/201; 116/207; 252/583; 374/162; 428/220; 428/332; 428/411.1; 428/474.4; 428/480; 428/500; 503/216; 503/225; 503/226

(58) Field of Classification Search .................. 252/586, 252/408.1, 600, 962, 583; 428/411.1, 472, 428/432, 433, 434, 698, 220, 332, 474.4, 428/480, 500; 534/787; 540/123, 130; 544/74; 546/154, 37; 548/454, 464; 552/261; 116/201, 116/207; 374/162; 503/201, 216, 225, 226; 427/150–152; 106/498, 311, 493, 31.17, 106/31.19, 31.2, 31.22
See application file for complete search history.

(56) References Cited

U.S. PATENT DOCUMENTS

| | | | | |
|---|---|---|---|---|
| 3,915,916 A * | 10/1975 | Leverett | .......... | 524/506 |
| 4,028,118 A | 6/1977 | Nakasuji et al. | | |
| 4,121,010 A | 10/1978 | Lasky et al. | | |
| 4,307,942 A | 12/1981 | Chahroudi | | |
| 4,421,560 A | 12/1983 | Kito et al. | | |
| 5,178,990 A * | 1/1993 | Satake et al. | .......... | 430/346 |
| 5,300,558 A * | 4/1994 | Kurisu et al. | .......... | 524/707 |
| 5,318,939 A | 6/1994 | Laver et al. | | |
| 5,527,385 A | 6/1996 | Sumii et al. | | |
| 5,849,651 A | 12/1998 | Takayama et al. | | |
| 5,879,443 A | 3/1999 | Senga et al. | | |
| 5,928,988 A | 7/1999 | Yamane et al. | | |
| 6,057,466 A | 5/2000 | Starzewski et al. | | |
| 6,440,592 B1 | 8/2002 | Meyer et al. | | |
| 6,489,377 B1 | 12/2002 | Bicer et al. | | |
| 6,670,436 B2 * | 12/2003 | Burgath et al. | ........ | 526/213 |
| 6,706,218 B2 | 3/2004 | Lucht et al. | | |
| 2002/0037421 A1 | 3/2002 | Arnaud et al. | | |
| 2002/0065401 A1 | 5/2002 | Feiler et al. | | |
| 2003/0109910 A1 | 6/2003 | Lachenbruch et al. | | |
| 2005/0147825 A1 | 7/2005 | Arnaud et al. | | |
| 2005/0227047 A1 | 10/2005 | Sutter et al. | | |
| 2006/0166822 A1 | 7/2006 | Senga et al. | | |
| 2006/0189737 A1 * | 8/2006 | Pieslak et al. | ........ | 524/405 |
| 2006/0246292 A1 * | 11/2006 | Seeboth et al. | ........ | 428/411.1 |

FOREIGN PATENT DOCUMENTS

| | | |
|---|---|---|
| DE | 133004 A1 | 11/1978 |
| DE | 35 23 661 A1 | 1/1987 |
| DE | 40 25 796 A1 | 2/1991 |
| DE | 196 42 886 A1 | 4/1998 |
| DE | 696 21 627 T2 | 2/2003 |
| DE | 103 12 464 A1 | 9/2004 |
| DE | 103 39 442 A1 | 3/2005 |
| DE | 102007017791 A1 | 10/2008 |
| EP | 0 477 140 A2 | 3/1992 |
| EP | 0 524 692 A1 | 1/1993 |
| EP | 0 677 564 A2 | 10/1995 |
| EP | 1 084 860 A2 | 3/2001 |
| EP | 1 084 860 B1 | 3/2001 |
| EP | 1 157 802 A2 | 11/2001 |

(Continued)

OTHER PUBLICATIONS

A. Seeboth, Chun Yin, J. Kriwanek, D. Lotzsch, R. Schaper, Thermochromic Polyolefin Foils, Journal of Applied Polymer Science, vol. 96, 1789-1792 (2005), © 2005 Wiley Periodicals, Inc.*
A. seeboth, A. Klukowska, R. Ruhmann and D. Lotzsch, Thermochromic Polymer Materials, Chinese Journal of Polymer Science vol. 25. No. 2. (2007). 123-135.*
Bamfield, "Chromic Phenomena," The Royal Society of Chemistry, 33-41 (2001).
Seeboth et al., "Thermochromic Polymers," Encyclopaedia of Polymer Science and Technology/20:11 1-23 (2003).
English translation of International Preliminary Report on Patentability, International Application No. PCT/EP2008/003044, dated Nov. 10, 2009.

(Continued)

Primary Examiner — Bijan Ahvazi
(74) Attorney, Agent, or Firm — Leydig, Voit & Mayer, Ltd.

(57) ABSTRACT

The invention relates to a composite with inverse thermochromic properties, the composite changing from a colorless into a colored state with increasing temperature. The composite thereby contains a colorant, a developer and a fluxing agent and also an inorganic filler. The invention likewise relates to a composite material which contains a polymer-based matrix into which at least one composite with inverse thermochromic properties is doped. These composite materials are used in the field of sensor technology, solar technology, transport and communications technology and medical technology.

14 Claims, 1 Drawing Sheet

FOREIGN PATENT DOCUMENTS

| | | |
|---|---|---|
| EP | 1 211 300 A2 | 6/2002 |
| EP | 1 258 504 A1 | 11/2002 |
| EP | 1 323 540 A2 | 7/2003 |
| EP | 1 387 995 B1 | 2/2006 |
| JP | 9-235545 A | 9/1997 |
| KR | 10-2003-016589 A | 3/2003 |
| WO | WO 93/15625 A1 | 8/1993 |
| WO | WO 94/02257 A1 | 2/1994 |
| WO | WO 97/11830 A1 | 3/1997 |
| WO | WO 99/64488 A1 | 12/1999 |
| WO | WO 02/08821 A1 | 1/2002 |
| WO | WO 03/089227 A1 | 10/2003 |
| WO | WO 2005/021627 A1 | 3/2005 |
| WO | WO 2005/032838 A1 | 4/2005 |
| WO | WO 20051032838 A1 * | 4/2005 |
| WO | WO 2005/077665 A1 | 8/2005 |

OTHER PUBLICATIONS

Loxley et al., "Preparation of Poly(methylmethacrylate) Microcapsules with Liquid Cores," *Journal of Colloid and Interface Science*, vol. 28, pp. 49-62 (1998).

Seeboth et al., "Thermochromic Polymers," *Encyclopedia of Polymer Science and Technology, 3$^{rd}$ Edition*, Herman F. Mark, Ed., John Wiley & Sons, New York, NY, vol. 12, pp. 143-165 (2004).

Sirota et al., "Phase transitions among the rotator phases of the normal alkanes," *J. Chem. Phys.*, vol. 101, No. 12, pp. 10873-10882 (1994).

* cited by examiner

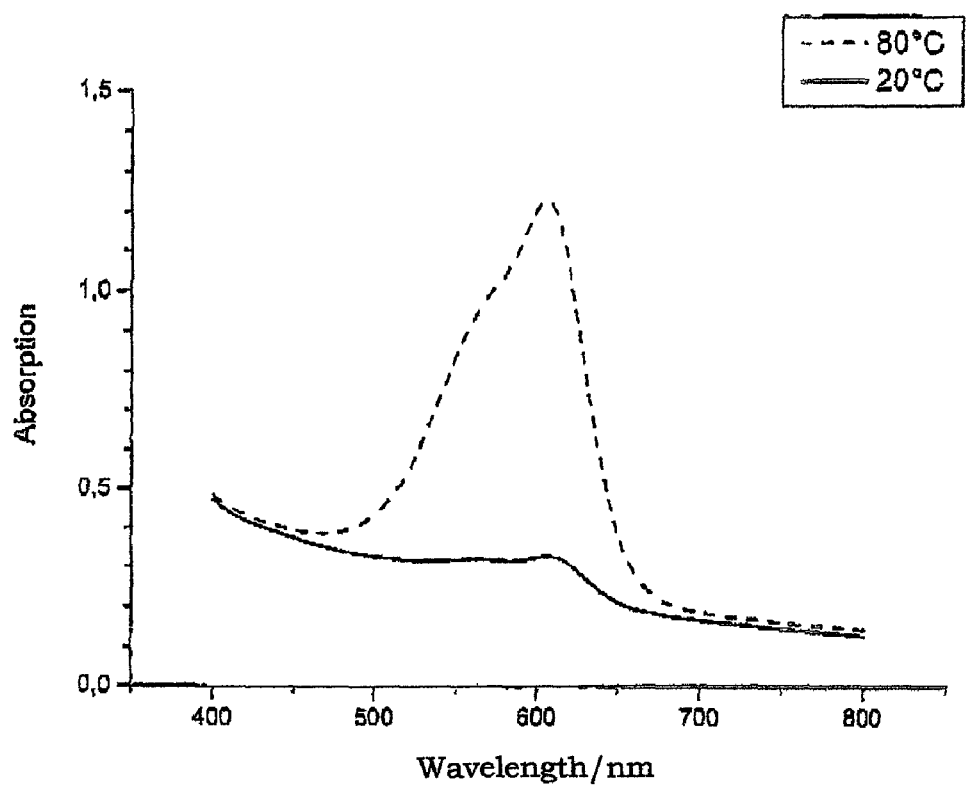

COMPOSITE WITH INVERSE THERMOCHROMIC PROPERTIES, COMPOSITE MATERIAL CONTAINING THIS AND ALSO USE THEREOF

The invention relates to a composite with inverse thermochromic properties, the composite changing from a colourless into a coloured state with increasing temperature. The composite thereby contains a colourant, a developer and a fluxing agent and also an inorganic filler. The invention likewise relates to a composite material which contains a polymer-based matrix into which at least one composite with inverse thermochromic properties is doped. These composite materials are used in the field of sensor technology, solar technology, transport and communications technology and medical technology.

Under the influence of external parameters, such as e.g. pressure, light, electrical fields and temperature, chromogenic materials change their optical behaviour. Thermochromism includes the capacity of a material to change its colour as a function of temperature, reversibly or irreversibly. This can be effected both by changing the intensity and/or the wavelength maximum. In Seeboth et al., Chinese Journal of Polymer Science 2007 (2) 123, the interaction between structure and thermochromism is explained in detail.

Materials based on different material components with general thermochromic properties are known from the state of the art. It is common to them that they generally have a thermally induced colour or transparency change. EP 1 084 860, U.S. Pat. No. 4,028,118 and U.S. Pat. No. 4,421,560 describe the switching of the colour effect, based on a donor-acceptor colourant system, with at least two further components. The change in colour is effected within wide temperature ranges, such as between $-50°$ C. to $120°$ C. or $-40°$ to $80°$ C. The smallest temperature difference is indicated in EP 1,084,860 at $30°$ C. The entire colourant system can be introduced into the polymer matrix optionally also in the form of microcapsules with a diameter of approx. 50 μm.

The production of polymeric thermochromic materials by means of printing (laminating) a thermochromic colour is a practical solution for some requirements and wishes of the packaging industry but does not achieve the set goal. Thus according to US 2002/037421, glasses are printed with a colour system for use for sun protection or, corresponding to U.S. Pat. No. 4,121,010, polymers are coated with a thermochromic colour, induced by sulphates, sulphides, arsenic, bismuth, zinc and other metals and oxides thereof.

As a result, both the field of use is greatly restricted and due to the required additional coating (printing technology) a cost-reducing continuous technology is prevented.

The production of organic thermochromic composites is still to date being optimised further and further. Thus further materials are constantly being doped to the basic composite, comprising at least one colourant, developer and fluxing agent. With respect to microencapsulation or control of the interactions between colourant-developer-fluxing agent, surfactant structures are increasingly being doped to the composite. There are used caprylates, malonates, oxalates, succinates, palminates, stearates, behenates or n-dodecylphenols, dodecylgallates, as described in EP 0 677 564.

All previously described thermochromic effects, reversible or irreversible, are based on a colour transition with temperature increase from coloured to colourless or from a coloured state into a differently coloured state. The change between different colours takes place by the combination of a plurality of thermochromic composites or by means of colour subtraction effects with a non-thermochromic colourant.

Thermochromic composites which switch from a colourless into a coloured state with temperature increase—i.e. systems with inverse thermochromism—are less known to date.

An inverse complex of this type, also termed pigment here, is described in US 2006/01668822 and EP 1 323 540. In both publications, the complex comprises—analogously to the known standard switch—a) an organic electron donor, b) an organic electron acceptor and c) an organic reaction medium with a melting point below $50°$ C. A disadvantage of this solution, in addition to high hysteresis in the switching process, is above all inadequate mechanical and chemical stability so that use in i) thermoplasts by means of extrusion technology, ii) duromers or iii) temperature-dependent coatings is not possible. Documents U.S. Pat. No. 5,849,651, U.S. Pat. No. 5,879,443 and U.S. Pat. No. 5,928,988 relate to the switching process from colourless to coloured in an organic thermochromic mixture by rapid cooling of the liquid phase without interaction to form a matrix.

The object therefore underlying the invention is to produce a completely novel thermochromic composite which can switch reversibly or irreversibly with temperature increase from colourless to coloured and with a temperature reduction from coloured to colourless and can be doped into a matrix of a composite materials whilst maintaining the thermochromism.

This object is achieved by the composite and composite material having the features described herein. The utility and advantageous developments of the invention are also described herein.

According to the invention, a composite with inverse thermochromic properties is provided, which comprises at least one colourant, at least one developer and also at least one fluxing agent. Furthermore, the composite contains at least one inorganic filler which influences the interactions between colourant and developer, which lead to the thermochromism, in such a manner that the colourless state is present at low temperatures so that, with increasing temperature, the composite changes from a colourless into a coloured state. With an increase in temperature, a molecular switching mechanism of the colourant is effected, as a result of which the composite changes into a coloured form. The fluxing agent can thereby likewise be involved actively in the interaction between colourant and developer.

Surprisingly, it could be established that the composite according to the invention is both mechanically stable and chemically resistant.

With respect to the inorganic fillers, compounds which interact with the colourant and/or the fluxing agent can be used. It is likewise possible that the inorganic filler is a complex which interacts with the colourant and/or fluxing agent.

The charged or polar centres of the fillers initiate degradation of the structure of a higher system consisting of colourant-filler-fluxing agent. The system can be supplemented by an organic developer, which is however not essential. This hybrid organic-inorganic complex controls the inverse thermochromic behaviour.

With respect to both previously mentioned variants, the filler surface can be modified cationically, anionically or amphiphilically.

Preferably, the inorganic filler is selected from the group consisting of metallic salts of the first and second main group of the periodic table, compounds based on $SiO_x$ and mixtures hereof.

The metallic salts are thereby selected preferably from the group consisting of lithium chloride, sodium chloride, magnesium chloride, aluminium chloride, boron chloride, tin chloride, titanium chloride, vanadium chloride, vanadium oxychloride, germanium chloride, phosphorus chloride, magnesium sulphate, barium sulphate, sodium sulphate, sodium hydrogen sulphate, sodium hydrogen phosphate, calcium carbonate, borax and mixtures hereof.

The compounds based on $SiO_x$ are preferably selected from the group consisting of silica, quartz glass, muscovite, nepheline syenite, wollastonite, xonolite and mixtures thereof.

A further preferred variant provides that the inorganic fillers are coated with organic or organosilicon compounds. There are hereby possible as organic compounds in particular alcohols, amines, naphthalene, anthracene and phenanthracene. The organosilicon compounds are preferably compounds of the general formula $X_n SiR_{4-n}$ with R=alkyl, vinyl, alkoxy, aminoalkyl or aminoalkoxy, independently of each other, and X=Cl, OH, $OCH_3$, $OC_2H_5$, independently of each other. Particularly preferred are aminoalkylsilanes, dimethyldimethoxysilane, hexamethyldisilazane, dimethyldichlorosilane and mixtures hereof. The alkyl or alkoxy groups are preferably selected from straight-chain or branched $C_1$-$C_{16}$ groups.

Reactions between organic filler and the organosilane or its hydrated form can lead to the formation of Lewis centres on the surface. This mechanism in the organic-inorganic thermochromic complex can be effected both before and directly in the extrusion step.

The colourant contained in the composite is preferably selected from the group consisting of pyridinium phenolate betaines, sulphophthalein structures, Reichhardt colourants, triphenylmethane colourants, pyranines, indicator colourants, azo colourants and mixtures thereof.

A preferred variant provides that the composite has an inorganic compound which serves as developer and filler. Hence developer and filler are present as a single compound.

The developer is preferably selected from the group comprising 2,2'-bis(4-hydroxyphenyl)propane, 2,2'-bis(4-hydroxyphenyl)sulphone, gallic acid dodecylester and mixtures hereof.

The fluxing agent is preferably selected from the group consisting of octadecanol, dodecanol, hydroxycarboxylic acids, 1-hexadecanol and mixtures hereof.

The composite is present as inorganic-organic hybrid. It is distinguished in particular in that it has mechanical, thermal and chemical stability which allows processing, e.g. by extrusion or annealing.

The switching behaviour of the composite can thereby be both reversible and irreversible.

According to the invention, a composite is likewise provided, which comprises a polymer-based matrix with at least one doped-in composite, as was described previously.

The matrix is thereby preferably selected from the group consisting of thermoplasts, duromers, varnish or hydrogels. For particular preference, the matrix comprises polyethylene, polypropylene, polyester, polyamide, acrylonitrile-butadiene-styrene copolymer and copolymers and blends thereof.

The composite can thereby be distributed preferably homogeneously in the matrix so that the matrix has no concentration gradient with respect to the composite. The application of a twin-screw extruder and the use of commercial dispersion aids, such as Dispex, Efka, Ruetasolv or Glascol, also contribute to the homogeneous distribution.

The previously described composite materials are used for production of components for sensor technology, solar technology, transport and communications technology and medical technology.

Materials with inverse thermochromism open up completely novel fields of use in sensory technology, solar technology, transportation technology and medical technology. The application possibilities are extended even more by combining with standard thermochromic composites or with non-thermochromic colour pigments.

The invention is intended to be explained in more detail with reference to the subsequent example and the subsequent FIGURE without wishing to restrict said invention to the special embodiments shown here.

EXAMPLE 1

According to the invention, an inverse thermochromic composite can be produced by using the individual components crystal violet lactone (CVL), xonotlite, tetradecanol in the mass ratio 1:3:3.4. Subsequently, the composite is extruded with 4.5% by weight into a polyolefin film at a temperature above 255° C., the thermochromic effect being maintained. With a temperature increase, the film becomes blue. The thermochromic switching process is reversible in the temperature range of 20° C. to 80° C. (see FIG. 1).

FIG. 1 shows the absorption as a function of the wavelength of the polyolefin film according to the invention produced in example 1.

EXAMPLE 2

A thermochromic composite comprises the components CVL, muscovite, titanium chloride, phosphorus chloride. The mass ratio is 1:3:2:1.4. The composite is extruded homogeneously distributed with 3.7% by weight into a polyolefin film above 260° C. The inverse thermochromic switching process is reversible between room temperature and 85° C.

The invention claimed is:

1. A composite with inverse thermochromic properties, the composite changing from a colourless into a coloured state with increasing temperature, comprising a colourant, wherein the colourant is selected from the group consisting of pyridinium phenolate betaines, sulphophthalein structures, Reichhardt colourants, triphenylmethane colourants, pyranines, indicator colourants, azo colourants and mixtures thereof, a fluxing agent, and an inorganic filler selected from the group consisting of muscovite, nepheline syenite, wollastonite, xonolite and mixtures thereof or an inorganic filler selected from the group consisting of muscovite, nepheline syenite, wollastonite, and xonolite, wherein each of said muscovite, nepheline syenite, wollastonite, and xonolite has a coating of an organic or organosilicon compound, and mixtures thereof.

2. The composite according to claim 1,
   wherein the inorganic filler interacts with the colourant and/or the fluxing agent.

3. The composite according to claim 1,
   wherein the organic compound is selected from the group consisting of alcohols, amines, naphthalene, anthracene and phenanthracene and derivatives and mixtures thereof.

4. The composite according to claim 1, wherein inorganic filler has a coating of an organic compound selected from the group consisting of 2,2'-bis(4-hydroxyphenyl)propane, 2,2'-bis(4-hydroxyphenyl)sulphone, gallic acid dodecylester and mixtures thereof.

5. The composite according to claim 1,
   wherein the fluxing agent is selected from the group consisting of octadecanol, dodecanol, hydroxycarboxylic acids, 1-hexadecanol and mixtures thereof.

6. The composite according to claim 1,
wherein the composite is an inorganic-organic hybrid.

7. The composite according to claim 1,
wherein the composite has mechanical, thermal and chemical stability which permits processing by extrusion or annealing.

8. The composite according to claim 1,
wherein the switching behaviour of the composite is reversible.

9. The composite according to claim 1,
wherein the switching behaviour of the composite is irreversible.

10. A composite material comprising a polymer-based matrix with at least one composite according to claim 1 doped therein.

11. The composite material according to claim 10,
wherein the matrix is selected from the group consisting of thermoplasts, duromers, varnish and hydrogels.

12. The composite material according to claim 10,
wherein the matrix is selected from the group consisting of polyethylene, polypropylene, polyester, polyamide, acrylonitrile-butadiene-styrene copolymer and blends thereof.

13. The composite material according to claim 10,
wherein the composite is distributed homogeneously in the matrix and the matrix has no concentration gradient with respect to the composite.

14. A method for producing components for sensor technology, solar technology, transport or communications technology or medical technology, comprising utilizing the composite material according to claim 10.

* * * * *